United States Patent [19]

Vijay et al.

[11] Patent Number: 5,717,745
[45] Date of Patent: Feb. 10, 1998

[54] SYSTEM AND METHOD OF EFFICIENTLY EVALUATING DIFFERENT MESSAGES BY A SERVER IN A TELECOMMUNICATIONS ENVIRONMENT

[75] Inventors: Padmanabhan Vijay, Cedar Rapids; Norman Reed, Solon, both of Iowa

[73] Assignee: MCI Communications Corporation, Washington, D.C.

[21] Appl. No.: 427,254

[22] Filed: Apr. 24, 1995

[51] Int. Cl.⁶ .............................. H04M 7/00; H04M 3/00
[52] U.S. Cl. .................. 379/112; 379/230; 379/266; 370/522
[58] Field of Search ...................... 379/112, 114, 379/115, 119, 121, 120, 266, 268, 269, 280, 134, 221, 201, 207, 219, 220, 309, 229, 230; 370/426, 385, 522

[56] References Cited

U.S. PATENT DOCUMENTS

| | | | |
|---|---|---|---|
| 4,421,955 | 12/1983 | Mori et al. | 179/18 EA |
| 4,646,294 | 2/1987 | Eliscu et al. | 370/94 |
| 4,757,529 | 7/1988 | Glapa et al. | 379/266 |
| 4,777,595 | 10/1988 | Strecker et al. | 364/200 |
| 4,811,337 | 3/1989 | Hart | 370/85 |
| 4,953,204 | 8/1990 | Cuschieg, Jr. et al. | 379/266 |
| 5,425,086 | 6/1995 | Hidaka et al. | 379/230 |
| 5,539,816 | 7/1996 | Pinard et al. | 379/229 |
| 5,563,941 | 10/1996 | Stademann | 379/266 |
| 5,592,542 | 1/1997 | Honda et al. | 379/255 |

*Primary Examiner*—Curtis Kuntz
*Assistant Examiner*—Binh K. Tieu

[57] ABSTRACT

The present invention effects optimal handling of validation requests from a telecommunications or data communications network by focusing on the process that needs to be done instead of estimating how long the processing will take based on the frequency of incoming validation requests. This is achieved by enabling the front end processor of a server, which receives the requests from a client, to look at each of the incoming messages to determine its message type. Once a message type is assigned to an incoming message, that message is routed to a queue assigned to that particular type of message. Processing is performed sequentially on each of the message waiting in the queue. And by adjusting the number of process modules available to each particular queue, the required end-to-end response time for that particular type of message requests is controlled. The number of queues is determined by the perceived number of message type requests forwarded to the server. Respective types of process modules are provided for processing the different types of messages. Respective response are sent by the different types of process modules to the client who requests the responses. A gateway for converting the different types of protocols associated with the incoming messages and outgoing responses is interposed between the server and the network.

19 Claims, 6 Drawing Sheets

SYSTEM AND METHOD OF EFFICIENTLY EVALUATING DIFFERENT MESSAGES BY A SERVER IN A TELECOMMUNICATIONS ENVIRONMENT

FIELD OF THE INVENTION

This invention relates to telecommunications or data communications networks and more particularly to a system and method therefor of receiving from a telecommunications or data communications network validation request messages and providing responses of those messages to the network within a predetermined end-to-end response time. The present invention further relates to the efficient distribution of validation request messages sent from a network to a file server and the processing of those messages by the server utilizing different processes in an expedient and efficient manner.

BACKGROUND OF THE INVENTION

Figure 1:
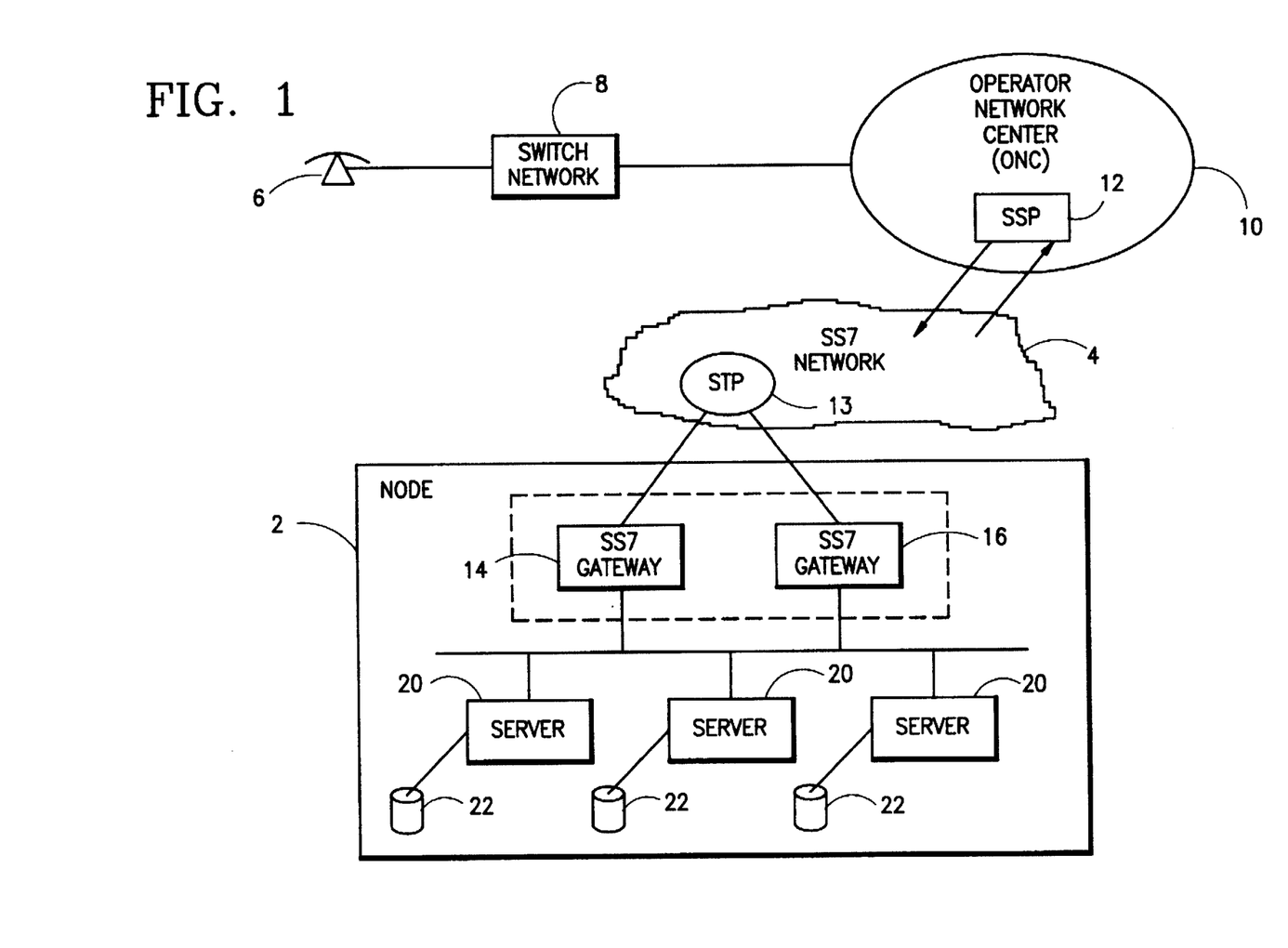

With reference to FIG. 1, there is disclosed an intelligent services network (ISN) node 2 connected to a telecommunications or data communications network 4. For the embodiment disclosed, network 4 is a SS7 public network and ISN node 2 is but one of a plurality of nodes connected to network 4.

A caller or subscriber at location 6 would originate a call to switch network 8 of a telecommunications service provider. The originated call is identified as a special service call, for example an operator assisted call, and is routed to an operator network center (ONC) 10. At ONC 10, the call is identified as either a calling card call or a third party call, etc. Switch network 8, in the meantime, prompts the caller to provide an authorization code which may for example be a number for a telephone calling card.

For the invention at hand, it is suffice to note that there is a service switch point (SSP) 12 in ONC 10 that provides the connection to SS7 network 4. Messages from the SS7 network 4 provided to node 2 are therefore SS7 protocol messages. As is well known, the SS7 network 4 utilizes a SS7 protocol that consists of the following four subprotocols: message transfer part (MTP), signalling connection control part (SCCP), integrated services digital network user part (ISUP), and transaction capabilities part (TCAP). A signalling transfer point (STP) 13 in network 4 provides the connection between network 4 and node 2.

Inside node 2 there are a number of gateways 14 and 16 each for receiving and transmitting messages in SS7 protocol format from/to network 4. Each of gateways 14 and 16 in turn is connected via a local area network (LAN) 18 to a number of file servers 20, each of which has connected to it a storage medium such as a database store 22. Gateways 14 and 16, both in terms of its structures and functions, are the same. Similarly, each of file servers 20 is the same structurally and functionally. Thus, for the purpose of the description of the instant invention, only one gateway and one file server are discussed.

In operation, when a caller places or originates a call at location 6, the service provider within whose service area location 6 is would prompt the caller, per either an operator or a voice recognition and verification system such as that disclosed in U.S. Pat. No. 5,127,043, the disclosure of which being incorporated herein by reference, to provide an authorization number such as for example the number imprinted on the telephone card issued to the caller. Upon receipt of the authorization code or number, the service provider of ONC 10 would need to make a determination on whether or not to put the call through to its destination. To make this determination, oftentimes the service provider needs to send a message, in the form of a validation request, to network 4, which in turn will forward it to node 2 wherein one of the servers 20 would compare the authorization number with a list of numbers (either valid or invalid numbers, i.e. so called positive or negative lists) to determine if the caller is a valid subscriber. If the authorization number is found valid, the special service call is completed. If not, no connection is made and the caller is thus informed.

For the embodiment shown in FIG. 1, the messages from the service provider at ONC 10 have a first signalling protocol, for example a SS7 protocol, while the signalling protocol in ISN node 2 may be of a different type, for example a NIDS sequenced packet protocol (NSPP). NIDS stands for network information distributed service.

To ensure that the messages having the SS7 protocol may be processed by file servers 20 and any responses generated from the messages which have the NSPP protocol may be read at ONC 10, gateway 14 acts as a converter for converting the SS7 protocol signals to NSPP signals, and vice versa, so that messages and responses would flow freely between SS7 network 4 and ISN node 2.

As was noted with respect to the embodiment of FIG. 1, the reason that a message is sent from network 4 to ISN node 2 is because the service provider at ONC 10 wants to validate the authorization number provided by the caller.

Figure 2:
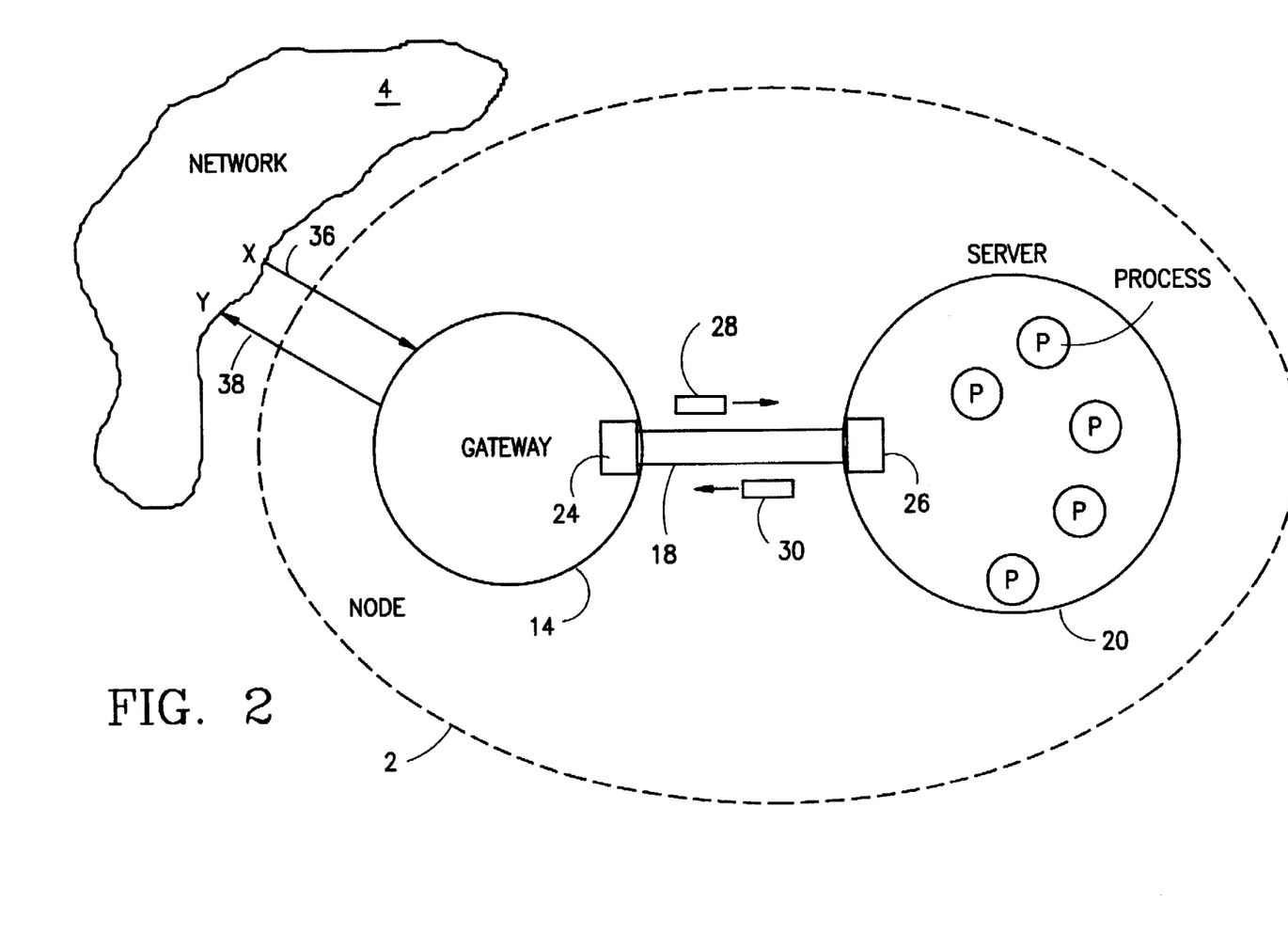
FIG. 2 illustrates the relationship between a network and a node in which a gateway and a server are provided.

FIG. 2 illustrates the interrelationship between gateway 14 and one of the servers 20. As was stated before, gateway 14 acts as a converter to convert the signalling SS7 protocol from network 4 to the signalling NSPP protocol used in node 2. Conversely, once a response has been generated by server 20 responding to a message, the signalling NSPP protocol of that response is converted by gateway 14 into an SS7 protocol for sending to network 4. Thus, for the FIG. 2 embodiment, gateway 14 can be presumed to be a client of server 20.

As further shown in FIG. 2, there is a back end process module 24 in gateway 14 which is connected by a communications path 18, which may be a LAN, to a front end module 26 at server 20. Messages such as a validation request message 28 and responses such as a validation response 30 traverse between server 20 and gateway 14 via path 18.

The system noted has an end-to-end response time requirement which arises as follows. When a message is sent from network 4 for example at X designated 32 to gateway 14, a finite time has to pass before that message gets converted by gateway 14 and routed to server 20. A further time is needed for a response to be generated and returned from server 20 to gateway 14 and then to network 4, as indicated by Y in network 4. This end-to-end response time between X and Y is an important requirement of the system. In other words, if the end-to-end response time for validating a caller's number is too long, chances are the caller would hang up and use some other service provider. For the embodiment for the instant invention, the end-to-end response time requirements are as follows: 95 percent of all queries from SSP 12 must be answered within 0.5 second; 99 percent of all queries from SSP 12 must be answered within 1 second; and a 100 percent of all queries from SSP 12 must be answered within 1.25 seconds.

Coupled to the above required response time is the further conundrum that realistically there is no way to predict ahead of time how many messages at any one time would arrive at any gateway 14 of network 4 (at least two gateways are shown in each ISN node). So, too, since there is a possibility that a number of gateways would access the same file server (at least three file servers are shown in each ISN node) for the same purpose, there is no way that prediction can be made at the server of the rate at which the messages would arrive thereto. And since the delay between the requests and the responses at a particular location, for example at gateway 14, directly affects the delay between the requests and the responses at another location, for example at server 20, a method (and a system therefor) must be found to ensure that independent of the complexity of the request, i.e. how much time a certain request takes to verify the validity of a call, the processing of other messages are not impacted. In other words, as successive messages are provided from network 4 to gateway 14 via link 36, there has to be some logic to govern that each request be sent to the particular processing it requests so that the appropriate type of response can be returned via link 38.

A first solution the inventors foresaw was a sequential method. As its name implies, the sequential method takes each message and processes it sequentially so that the first message in would always be the first message out. The problem with sending the messages sequentially to the server for processing is that although the messages are in most instances quite similar, there are certain messages whose requests require more time to process. Thus, when a special request message comes into the server that takes for example 1.25 seconds for processing, all of the other request messages that are behind that message would all be delayed at least 1.25 seconds, even though those other messages may require a much smaller processing time, for example 0.25 seconds. Putting it simply, all of the messages following that special request message effectively take 1.25 seconds for processing. Bearing in mind at this point that since there is no way of predicting how much time a request takes to be processed until the processing takes place, a catch 22 situation exists. This is moreover exacerbated by the fact that there is no way of predicting the rate at which the messages are coming in from network 4 at any instant of time.

A second solution that was considered by the inventors was the "load sharing" concept wherein messages from network 4 are distributed to the various processes in the server. There are a number of methods to perform load sharing. The first one is ordering/structuring. This is when an order or a structure is given to a request message according to its complexity. Putting it differently, the greater the complexity a request has, the more time is given. However, this method is not feasible because there is no a priori knowledge, i.e. the only way to find out how much time it takes to process a request is only after the request has been processed.

A second method is a flow control method in which a stop is raised by the process so that incoming messages are routed to some other process. This flow control method cannot be used in the above described embodiment of the instant invention because restricting incoming messages means that additional processes need be provided for those restricted messages.

Another method for load balancing that was rejected is the statistical load prediction method in which a statistical guess is made on how many messages are to be received for a predetermined period of time so that a distribution of those messages can be made. The problem with this method is that it is based on a pre-built statistical model. Thus, there is no guarantee that the server will perform at its peak because chances are the distribution model is built on past or predicted happenings which are not the same as the actual number of messages arriving at any given time.

Yet another deterministic model for load balancing the incoming messages that was rejected is the round robin method which is simply the circular distribution of the messages.

A final load balancing solution that was considered was the exchange of statistics information method in which a prediction is made on how much capacity is required based on previous processing. The problem with this method was the need for over-engineering to ensure that all incoming messages are taken care of. A large amount of computing resources is therefore needed.

BRIEF DESCRIPTION OF THE PRESENT INVENTION

The present invention method and system therefor enable the server to optimally service the client by processing incoming messages efficiently without over-engineering. To achieve this, there is provided in the invention server a number of queues each for receiving a particular type of incoming messages. For the present invention embodiment, three queues, namely a billed number screening (BNS) queue, an automated calling card system (ACCS) queue, and an operational measurement (OM) queue are provided. For other embodiments, depending on the number of types of incoming messages, a greater or smaller number of queues could be provided in the server. Associated with each of the queues is at least one processing engine, or module, for performing the process requested by the particular type of message.

Provided at the front end of the server is a module for receiving each of the incoming messages and determining the type of message each incoming message is. For the illustrated embodiment of the instant invention, it is assumed that there are only three types of messages, namely BNS messages, ACCS messages, and OM messages - input to and serviced by the server.

Once an incoming message has been determined to be of a particular type, that message is routed to the corresponding queue. At the same time, each process, or processes, associated with the particular queue would retrieve the first available message stacked in the queue and perform the requested processing. As soon as that processing is done for a particular message, the next available message in the same queue is retrieved and processing for that message commenced by the associated process module. Similar processings occur for the respective different messages stacked in the respective queues. Thus, the processing of each incoming message is performed by the particular process module (s) associated with that message and that processing is not dependent on any previous messages. Putting it differently, the processing of each message is not time dependent on what went on before, but rather is based directly on the processing time required for that particular message.

To ensure that the messages in each of the queues are not backed up and that the required end-to-end response time for each message type be met, a number of the same process module(s) may be provided for each of the queues so that a number of the same type of messages may be processed at the same time.

It is therefore an objective of the present invention to provide a method and system therefor of enabling a server to provide a response for each incoming request efficiently without over-engineering.

It is another objective of the present invention to provide a method and system therefor of processing incoming messages in a non-deterministic approach.

It is yet another objective of the present invention to provide a system that can validate the account provided by a caller within a required end-to-end response time.

It is still another objective of the present invention to provide a flexible system and method therefor in which incoming messages from a client are distributed to the different processes in the server optimally.

BRIEF DESCRIPTION OF THE DRAWINGS

The above mentioned objectives and advantages of the present invention will become apparent and the invention itself will be best understood by reference to the following description of an embodiment of the invention taken in conjunction with the accompanying drawings, wherein:

FIG. 1 is an illustration of various components residing in a telecommunications environment in which the instant invention is a part of;

DETAILED DESCRIPTION OF THE INVENTION

With reference to FIG. 2, as noted above, a gateway 14 is connected by means of a communications path 18 to a file server 20. Gateway 14 may be a processing system comprising a VAX 11 computer by the Digital Equipment Company, while server 20 may comprise an IBM RS6000 computer. Communications path 18 may be an ethernet LAN.

As further noted above, gateway 14 converts the signalling protocol of the messages provided from network 4 to the internal signalling protocol of node 2. The thus converted protocol messages, in most instances, are validation messages that request the server to look up a list or table of numbers in a line information database (LIDB) to determine if the authorization code provided by a caller is valid. Each of the messages may be represented by packet 28 between gateway 14 and server 20.

After the validation process, whether or not the authorization code is determined to be valid, a response, represented by a packet 30, is output by server 20 to gateway 14. There response packet 30 is converted from the internal NSPP protocol to the protocol of the network, i.e. the SS7 protocol. The thus converted protocol response is output via link 38 to network 4.

Each type of message that comes into server 20 requires that a particular process, or processes, be performed in order to obtain a response. The different processes represented by P in server 20 may be considered as process modules, routines or programs each performing a given process.

For the embodiment shown in FIG. 2 it is assumed that there are three types of messages provided from network 4 (originally from the server provider at ONC) to gateway 14. These messages are for example a billed number screening (BNS) message, an automating calling card system (ACCS) message, and an operational measurement (OM) message. As their respective names imply, each of the three types of messages requires a different type of processing. For example, the BNS message requests that a particular process module in server 20 be used to perform the billed number screening process. Likewise, the ACCS message and the OM message each require a specific type of processing that only corresponding processing modules can perform. For the instant invention, how each message is processed is not of import and hence no detailed discussion of the different processes is given herein. For the FIG. 2 embodiment, therefore, it is suffice to note that given the assumption that there are only three types of messages, only three types of processing need to be performed.

That notwithstanding, it should be noted that each processing of one of those message types may in actuality require different processing by different process modules. However, for the sake of simplicity, for the discussion herein assume that only one type of process is to be performed for each type of message. It should furthermore be noted that albeit only three types of messages are described herein, the instant invention can actually accommodate an N number of types of message, and therefore N number of types of processing. It should moreover be noted that each type of messages may require a processing time that is different from the others. For example, for the instant invention embodiment, assume the OM type message to require a processing time that is greater than that of the ACCS type message, which in turn requires a processing time greater than that for a BNS message.

Given the requirement of the end-to-end response time mentioned earlier, the inventors of the instant invention, after considering the various mentioned above load sharing methods, came to the realization that so long as each successive message is distributed to a process module that has just finished processing, then it is guaranteed that all of the messages will be processed as quickly as possible. Putting it differently, the inventors realize that it is the process modules, i.e. the processing, that determine the speed at which responses can be generated. Putting it yet differently, the inventors realize that the fastest time that a server can generate a response for a request is if the process module for that type of request message were to retrieve the next one of the same type of message as soon as it finishes with the previous one. Further, if there are copies of the same process module each for processing the same type of incoming messages, the response time for those messages can be decreased. Based on this realization, the instant invention, as exemplified in FIG. 3, came into being.

Figure 3:
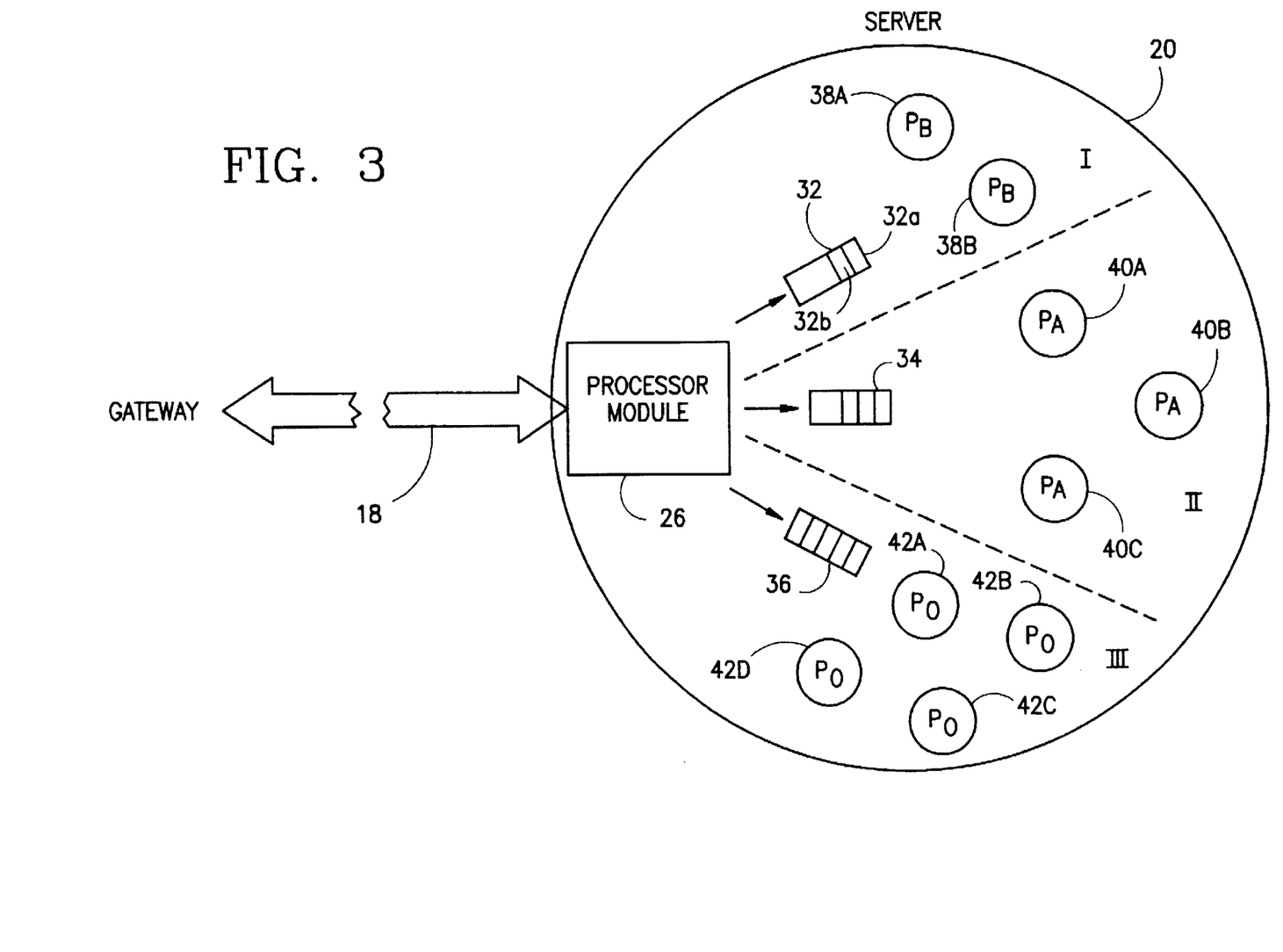
FIG. 3 is an illustration of the present invention system.

With reference to FIG. 3, server 20 is shown to include a plurality of queues each adaptable to receive a particular type of message being routed to server 20 from gateway 14 via path 18. For the sake of illustration and simplicity, server 20 is shown to be divided into three process portions I, II and III. Process I corresponds to queue 32 which for purposes of explanation can be thought of as a BNS queue. In the same vein, process II corresponds to ACCS queue 34 and process III to OM queue 36. Also residing in server 20 is a front end processor 26 for receiving the messages being routed thereto by gateway 14 and determining the type of each incoming message. In other words, processor module 26, after receiving an incoming message, would review that message, as for example at its header, to determine the type of message it is. If the message is determined to be a BNS message, it is routed to BNS queue 32. Similarly, if the message is determined to be an ACCS type message, it is routed to the ACCS queue 34 so that ACCS processing can be performed to generate a response for that message. Lastly, if an incoming message is determined to be an OM type message, it is routed to OM queue 36.

Further with reference to FIG. 3, it can be seen that process portions I, II and III of server 20 each have a number of process modules Pn. For example, associated with the BNS queue 32 are two process modules 38a and 38b. Similarly, associated with ACCS queue 34 are a number of process modules 40a-40c. Lastly, associated with OM queue 36 are a plurality of process modules 42a-42d. Insofar as the processing for each of the BNS, ACCS and OM messages is different, the end-to-end response time for each type of message is different. For the instant invention embodiment, it is assumed that the BNS message has the shortest required end-to-end response time, the OM type message the longest, and the ACCS message somewhere in between.

In operation, when a message is received by front end module 26, a determination is made of the type of message it is. Given the universe for this exemplar embodiment of only three types of messages, namely BNS, ACCS and OM, presuppose that the incoming message is a BNS type message. On receipt at module 26, the message is routed to queue 32 as a first message at position 32a, assuming that queue 32 was empty. For the I type process which corresponds to the BNS process, given that there are for example two process modules 38a and 38b each of which performs the same processing, one of them will retrieve the BNS message at 32a and begin to process it. In the meantime, additional messages are arriving from path 18 to processor module 26 and are identified as to their respective types. The thus identified messages are routed to the respective queues 32, 34 or 36.

Assume a second BNS message has arrived and was put at location 32b a moment before process module 38a retrieved the BNS message at 32a. At that moment then there are two BNS messages in queue 32. Given that process module 38a, at the next instant, is assumed to retrieve the first BNS message at position 32a of queue 32, process module 38b would remain available to retrieve the next BNS message, namely the BNS message that was put into queue 32 at location 32b which naturally is moved along the queue to now location 32a and becomes available for retrieval by process module 38b. In the meantime, additional BNS type messages are being routed to queue 32 and are being stacked therein. As soon as process module 38a finishes the processing of the first BNS message, a response is generated and routed back to module 26 to be forwarded via path 18 to gateway 14 for conversion, and eventual outputting to network 4 via link 38. Having sent the response, process module 38a now becomes available to do additional processing. And if there remains in queue 32 a BNS message that needs to be processed, process module 38a would retrieve it and begin processing thereof. At the same time, process module 38b continues to processing the request from the second BNS message. And as soon as it finishes its processing and has generated a response therefor, it becomes available for the next BNS message, if any, waiting in queue 32.

The same operation is repeated for processes II and III. Inasmuch as it was presumed that the processing time for the ACCS type message takes longer than the BNS type message, additional copies of the same process module may be provided for the ACCS type processing if the number of incoming ACCS and BNS type messages are the same. Thus, three process modules 40a-4c are shown to perform the ACCS type processing. Thus, for the embodiment shown in FIG. 3, each of process modules 40a-40c may at any one time be processing a given ACCS message. Depending on the required end-to-end response time, additional process modules 40 may be added to shorten the response time, as will be explained with reference to FIGS. 4 and 5 later.

Given the assumption that the required end-to-end response time is yet greater for the OM type message, for illustration purposes, four different process modules 42a-42d are shown in the type III process. But it should be noted that for other types of messages, a varied number of process modules, anywhere from one to a number greater than four, may be used. The number chosen, as noted above, is dependent on the required end-to-end response time and the frequency of the particular type of message request arriving at the server. Although not shown, each of the process modules of FIG. 3 can retrieve information from the LIDB database either resident in server 20 or external thereto, as for example database store 22 shown in FIG. 1.

Figure 4:
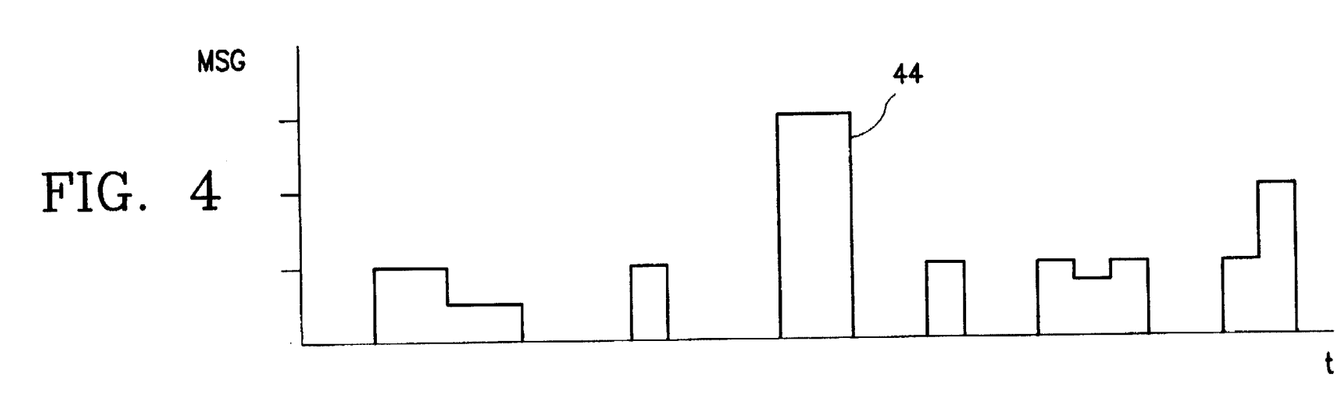
FIG. 4 is a time based graph showing the changes in the number of messages arriving during a given time.
Figure 5:
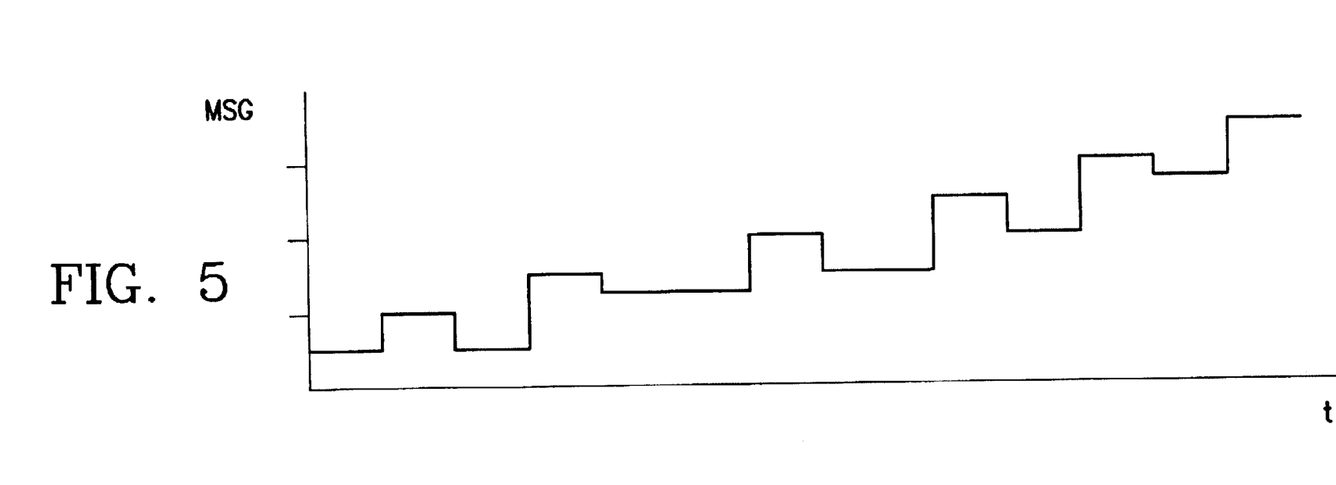
FIG. 5 is a time based graph showing the accumulation of message for a particular queue in which insufficient number of process modules are provided.

FIGS. 4 and 5 each show the number of messages being sent to sever 20 as a function of time. By means of FIGS. 4 and 5, an exemplar method of determining an optimal number of process modules to be provided for each type of message is given herein.

In FIG. 4, for the given time period shown, assuming that there are only BNS type messages, it can be seen that the greatest number of messages sent to server 20 is indicated at 44. For most of the other times, the number of BNS messages being routed to server 20 fall well below the peak indicated at 44. Thus, by empirical methods, the operator of the system can make sure that queue 32 has the capacity to queue incoming BNS messages at peak times and that there are sufficient number of process modules 38 for processing the incoming messages. Putting it differently, there needs to be a sufficient number of process modules 38 to ensure that the number of BNS type messages would not exceed the peak shown at 44, so that the required end-to-end response time for the BNS type message is not exceeded. Of course, a greater number of process modules 38 may be added to process I to make the response time even shorter. However, that would be over-engineering since it takes up additional capacity of the server which may very well be used for something else. Therefore, to be most efficient, it is desirable to have only the minimum number of process modules to ensure that the number of the particular type of incoming messages do not exceed a given plateau and that the required end-to-end response time for that particular type message is not exceeded. Thus, by adjusting the number of process modules with respect to each type of message and the number of messages that are expected at peak time periods, an optimal balance between the number of process modules as required by the end-to-end response time is achieved.

The size of the queue, in terms of the number of messages sitting in the queue for processing, and how it affects the required end-to-end response time is illustrated in FIG. 5. To elaborate, the number of messages sitting in each queue is determined by the difference between the speed with which the corresponding process modules validate the message request. Since the rate at which messages arrive at processor module 26 and the time it takes for front end module 26 to determine the message type take relatively little time, the messages are put into the respective queues at relatively no time at all. However, the processing of each message request does take a finite time. Thus, assuming that five messages arrive at a queue at a second and only four messages can be processed at any one second, then for every additional second there would be one additional message added to the queue. Putting it differently, for every second, server 20 gets one message behind. This stepwise increase is illustrated in FIG. 5. Eventually, the required end-to-end response time will be exceeded.

Thus, if an operator of the system at any time begins to see a pattern at a process portion of the server that resembles the graph of FIG. 5, he can add one or more additional process modules that perform the same processing to that process portion to shorten the number of messages waiting in the queue of that process portion. The present invention therefore provides a way to manipulate different types of processes by simply adding or subtracting process modules without adding additional infrastructure to the server. Thus, if an increase of capacity is required, the operator only needs to provide additional copies of the same process module for handling the additional workload. Conversely, if it is deemed that there are more than enough process modules to take care of a particular type of message request, then the number of that type of process modules can be decreased, until a balance is reached where there are sufficient process modules to handle the incoming messages within the required end-to-end response time.

Figure 6:
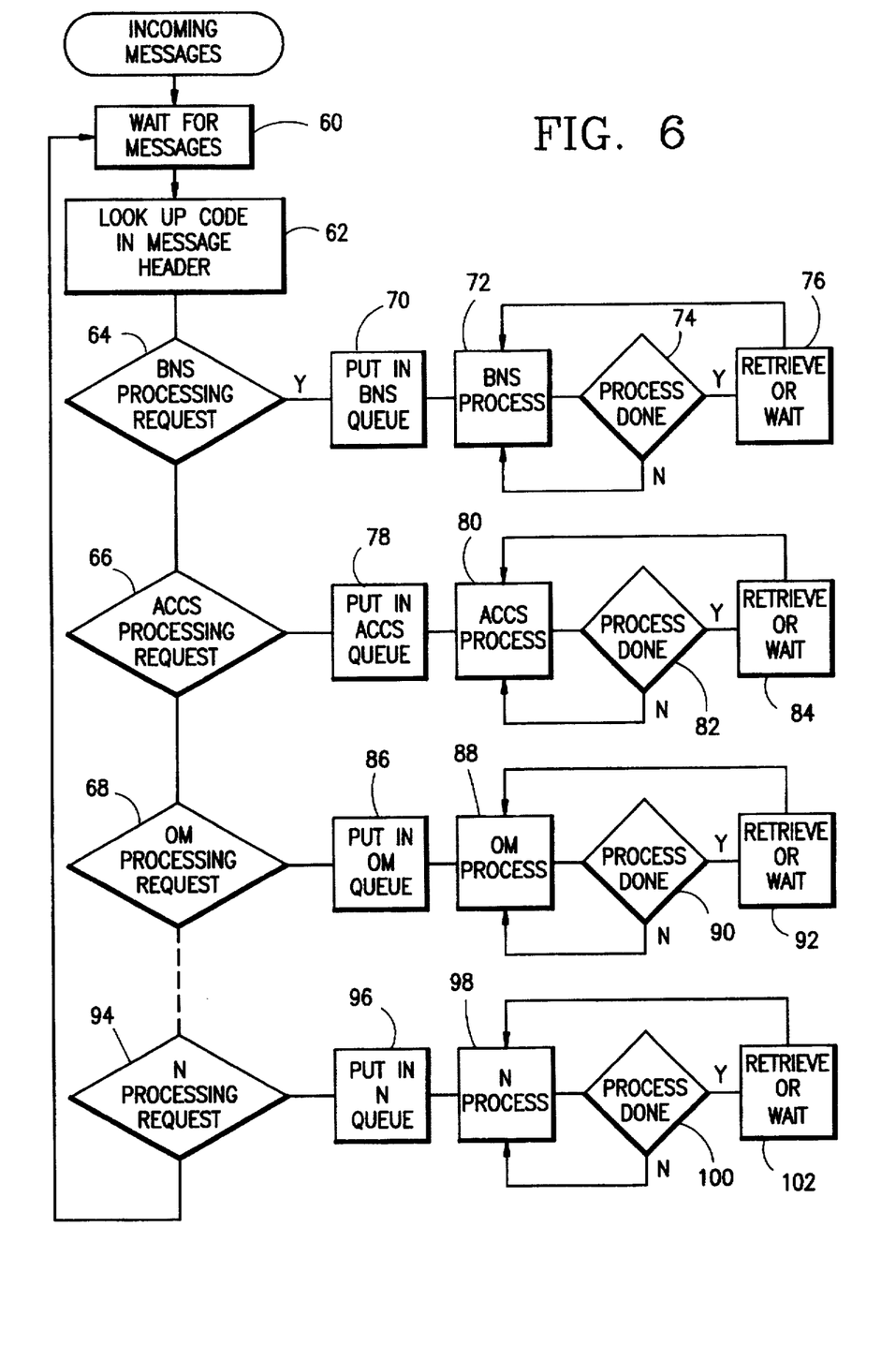
FIG. 6 is a flow chart for explaining the processing of the instant invention.
Figure 7:
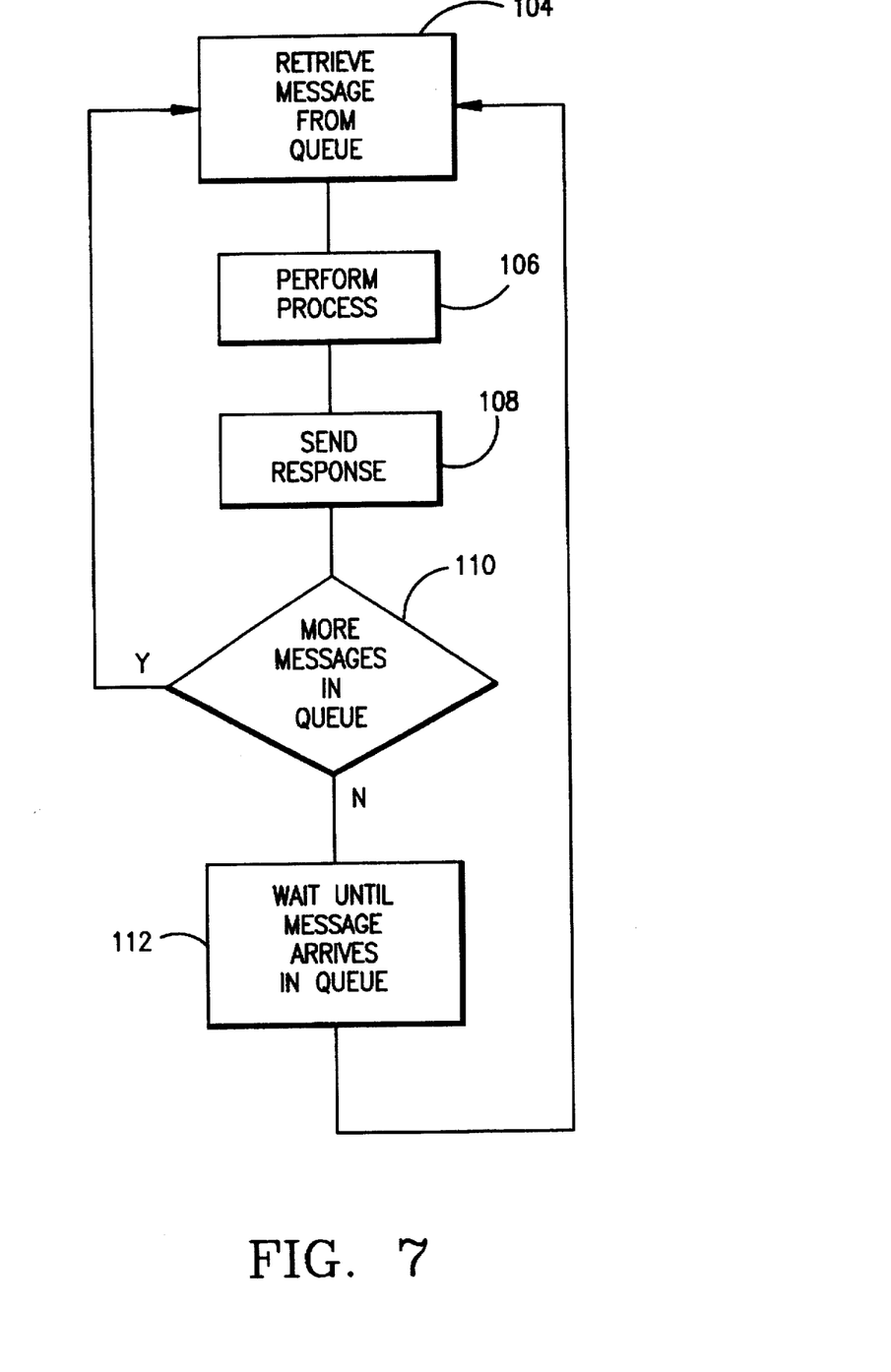
FIG. 7 is a flow chart further illuminating the processing that takes place for each of the process modules.

The operation of server 20 is illustrated by the flow charts of FIGS. 6 and 7. Starting with FIG. 6, server 20, more specifically the front end module 26, waits for incoming messages at block 60. When a message is received, front end module 26 would look up the code or flag in the message, for example at its header, to determine its message type at block 62. For the embodiment of the instant invention, given that the types of messages to be determined are limited to BNS, ACCS and OM, the determination of the message type of an incoming message is done in decision blocks 64, 66 and 68. As shown, the message request is first sent to block 64 to determine if it is a BNS type message. If it is, that message is put into the BNS queue, for example 32 shown in the FIG. 3 embodiment, at block 70. A BNS process, as indicated in block 72, then takes place by means of one of the process modules 38 which is illustrated in greater detail in the flow chart of FIG. 7. Once the process is done, as determined in decision block 74, the process module either retrieves the next BNS type message, if any, waiting in queue 32, or just waits until there is an indication that there is a message waiting to be processed at the BNS queue.

If the message is determined not to be a BNS type message, the operation of server 20 next proceeds to decision block 66 to determine if the message is an ACCS type validation request message. If it is, that message is put into the ACCS queue at block 78. Thereafter, processing of the ACCS message takes place per block 80. Once the processing is done, as indicated by decision block 82, the ACCS process module would retrieve the next waiting ACCS type message from the ACCS queue for processing per block 84. If there is no ACCS message waiting in the ACCS queue, the ACCS process module would wait until an indication is received that there is. Alternatively, the system may be designed to have each idle process module periodically look into the queue to determine if there is a message waiting. If there is, the idle process module would retrieve that message for processing. If not, it would remain idle for a predetermine period of time, and then return to the queue to see if there is any message present.

The same process as above is repeated for the instance where an incoming message is determined to be an OM message in decision block 68. Those processes are indicated by blocks 86, 88, 90 and 92.

As discussed earlier, the instant invention can be expanded to include N types of messages. This is indicated by blocks 94, 96, 98, 100 and 102. In any event, once a determination has been made of the message type of an incoming message, the system would return to block 60 to wait for the next incoming message.

FIG. 7 is a flow chart illustrating in particular the process that takes place in blocks 76, 84, 92 and 102. As shown in block 104, a message is retrieved from the appropriate queue by its corresponding process module. And depending on the type of request, a particular process is performed in block 106. A response is generated as a result and sent to front end processor module 26 at block 108. A decision is next made on whether there are additional messages in the queue in block 110. If there is, that message is retrieved and processed. If there is no message waiting in the queue, the process module would wait until the next message arrives in the queue at block 112. Thereafter, that message is retrieved for further processing.

Inasmuch as the present invention is subject to many variations, modifications and changes in detail, it is intended that all matters described throughout this specification and shown in the accompanying drawings be interpreted as illustrative only and not in a limiting sense. Accordingly, it is intended that the invention be limited only by the spirit and scope of the appended claims.

We claim:

1. In a telecommunications environment in which a telecommunications or data communications network is communicatively connected to a server means and messages requesting different processes to be performed by said server means being sent from said network to said server means, a method of optimizing the distribution of said messages to said different processes in said server means comprising the steps of:

(a) reviewing each incoming message to determine the type of process requested by said message;

(b) routing said each message to a queue means according to the type of process requested, there being a plurality of queue means each assigned to a particular process;

and for each of said different processes (c) retrieving from the queue means assigned thereto the next available message for processing as soon as the processing for the previous message is finished.

2. The method of claim 1, wherein said step (a) comprises the step of:

reviewing said each message to determine if said message is a BNS (Billed Number Screening) message, an ACCS (Automated Calling Card System) message or an OM (Operational Measurement) message.

3. The method of claim 2, wherein said step (b) comprises the step of:

routing each BNS message to a BNS queue means, each ACCS message to a ACCS queue means and each OM message to an OM queue means.

4. The method of claim 1, further comprising the step of:

utilizing a multiple number of a particular one of said different processes for processing respective messages requesting said particular one process so that the number of messages waiting in the queue means assigned to said particular one process does not exceed a predetermined number.

5. The method of claim 1, further comprising the step of:

increasing the number of each of said different processes for performing processing on the messages routed to each of said queue means requesting said each different process so that the messages sent to said server means are processed and responses generated within a predefined time period.

6. A method of minimizing the delay in which a server means returns responses of different types of messages sent from a telecommunications or data communications network to said network, said sever means being communicatively connected to said network and including a plurality of process means at least one of which for performing a particular process requested by each type of said messages, comprising the steps of:

(a) reviewing each sent message to determine the type of process requested by said each message to be performed by said server means;

(b) defining a plurality of queue means each corresponding to one type of said messages;

(c) sending said each message to one of said plurality of queue means according to the type of said each message;

(d) processing sequentially each successive message in each of said plurality of queue means by at least a corresponding one of said plurality of process means assigned to perform processing of messages from said each queue means as soon as the processing for the previous message in each of said plurality of queue means is finished;

(e) returning a response for each of said successive messages resulting from processing thereof from each of said plurality of queue means to said network;

whereby each message sent to said server means is processed and a response generated according to the type of message it is independent of potential time differences required for processing said different types of messages.

7. The method of claim 6, further comprising the step of:
providing a sufficient number of the same process means for processing each type of message to ensure that each message sent to said server means is processed and a response generated within the minimum amount of time for that type of message.

8. The method of claim 6, wherein said step (a) comprises the step of:
reviewing said each message to determine if said message is a BNS (Billed Number Screening) message, an ACCS (Automated Calling Card System) message, or an OM (Operational Measurement) message.

9. The method of claim 6, wherein said step (b) comprises the step of:
providing at least one BNS queue, one ACCS queue, and one OM queue.

10. The method of claim 8, wherein step (c) comprises the step of:
routing each BNS message to a BNS queue, each ACCS message to a ACCS queue, and each OM message to an OM queue.

11. A server means communicatively connected to a telecommunications or data communications network comprising:
means for receiving from said network different types of messages requesting different processes to be performed;
means for reviewing each incoming message to determine the type of said incoming message;
a plurality of queue means each assigned to receive messages of a particular type;
means for routing said each incoming message to a one of said queue means assigned to receive the type of message said message is;

a plurality of process means at least one of which being assigned to a corresponding one of said queue means for retrieving from said corresponding queue means the next available message for processing as soon as it finishes processing the previous message from said corresponding one queue means.

12. The server means of claim 11, wherein said reviewing means reviews said each message to determine if said message is a BNS (Billed Number Screening) message, an ACCS (Automated Calling Card System) message or an OM (Operational Measurement) message.

13. The server means of claim 12, wherein said plurality of queue means comprises:
a BNS queue to which BNS messages are routed;
an ACCS queue to which ACCS messages are routed; and
an OM queue to which OM messages are routed.

14. A node connected to a telecommunications or data communications network comprising:
a server means including
means for receiving messages sent from said network to request performance of at least one process;
a plurality of process means each for performing at least one process requested by a given type of said messages;
means for reviewing each of said messages to determine the type of process requested by said each message;
a plurality of queue means each for receiving one type of messages;
means for sending each of said messages to the one of said plurality of queue means set to receive the type of message said each message is;
wherein said process means generates seriatim a response for each successive message in each of said plurality of queue means as soon as the processing of the previous message from said each of said plurality of queue means is finished so that a response is generated for each type of message independent of the different amounts of time required for processing the different types of messages to thereby minimize the delay in returning responses of messages by said server means to said network.

15. The node of claim 14, further comprising:
a gateway for receiving said messages from said network and for forwarding said responses generated by said process means to said network.

16. The node of claim 14, further comprising:
a sufficient number of the same process means for processing each type of message to ensure that each message sent to said server means is processed and a response generated within the minimum amount of time for that message.

17. The node of claim 14, wherein said messages comprise:
a BNS (Billed Number Screening) message;
an ACCS (Automated Calling Card System) message; or
an OM (Operational Measurement) message.

18. The node of claim 14, wherein said queue means comprises:
at least one BNS queue, one ACCS queue, and one OM queue.

19. The method of claim 17, wherein said process means comprises:
at least means for processing said BNS messages, said ACCS messages, and said OM messages.

* * * * *